United States Patent [19]
Griffith et al.

[11] Patent Number: 5,861,448
[45] Date of Patent: Jan. 19, 1999

[54] ORGANOHYDROGENSILOXANE RESIN CROSSLINKER CURABLE ORGANOSILOXANE COMPOSITION WITH IMPROVED HYSTERESIS CHARACTERISTICS

[75] Inventors: Phillip Joseph Griffith, Llandough, Great Britain; Chu Yat Ho, Taipei, Taiwan; Diane Marie Kosal, Midland, Mich.

[73] Assignee: Dow Corning Corporation, Midland, Mich.

[21] Appl. No.: 792,238

[22] Filed: Jan. 31, 1997

[51] Int. Cl.$^6$ ...................................................... C08K 9/06
[52] U.S. Cl. .......................... 523/213; 524/188; 524/493; 524/730; 524/789; 524/714; 524/837; 524/267; 524/731
[58] Field of Search ............................ 523/213; 524/188, 524/493, 730, 789, 714, 837, 267, 731

[56] References Cited

U.S. PATENT DOCUMENTS

| | | | |
|---|---|---|---|
| 3,419,593 | 12/1968 | Willing | 260/448.2 |
| 3,445,420 | 5/1969 | Kookoootsedes | 260/37 |
| 3,989,667 | 11/1976 | Lee et al. | 26/46.5 |
| 4,753,978 | 6/1988 | Jensen | 524/862 |
| 5,679,727 | 10/1997 | Griffith et al. | 524/730 |

*Primary Examiner*—Melvyn I. Marquis
*Attorney, Agent, or Firm*—William F. Boley

[57] ABSTRACT

A platinum curing organosiloxane composition having improved hysteresis characteristics when cured. The composition requires the presence of a diorganovinylsiloxy terminated polydiorganosiloxane having a viscosity within a range of about 20 Pa·s to 200 Pa·s at 25° C. and containing essentially no ethylenically unsaturated hydrocarbon radicals bonded to non-terminal silicon atoms and a diorganovinylsiloxy terminated polydiorganosiloxane having a viscosity within a range of about 0.1 Pa·s to 200 Pa·s at 25° C., where from 1 to 5 percent of the non-terminal repeating units of the siloxane comprise a vinyl radical. In addition, the present composition comprises 10 to 30 weight percent of a reinforcing silica filler that has been treated with hexamethyldisilazane and 1,1,3,3-tetramethyl-1,3-divinyldisilazane, and an organohydrogensiloxane resin crosslinker comprising greater than 5 silicon-bonded hydrogen atoms per molecule.

24 Claims, No Drawings

ORGANOHYDROGENSILOXANE RESIN CROSSLINKER CURABLE ORGANOSILOXANE COMPOSITION WITH IMPROVED HYSTERESIS CHARACTERISTICS

BACKGROUND OF INVENTION

The present invention is a platinum curing organosiloxane composition having improved hysteresis characteristics when cured. The present compositions are particularly useful as materials of fabrication for keyboard pads used in electronic keyboards.

The use of various platinum cured organosiloxane compositions as material of construction for keyboard pads is well known in the art. A common problem associated with such previously known organosiloxane compositions is poor hysteresis characteristics, evidenced as a lack of rebound or crispness in the feel of the keys of a keyboard when depressed. The present inventors have discovered a unique combination of vinyl-substituted organosiloxane polymers, filler concentration, filler treating agents, and organohydrogensiloxane resin crosslinking agent having a high level of hydrogen substituted on silicon, that provides a cured organosiloxane composition having excellent hysteresis characteristics.

Jensen, U.S. Pat. No. 4,753,978, teaches an organosiloxane composition comprising two diorganovinylsiloxy terminated polydiorganosiloxanes which can be platinum cured to form elastomers having high tear strength. Jensen teaches a curable mixture comprising 70 to 95 percent by weight of the mixture of a diorganovinylsiloxy terminated polydiorganosiloxane containing vinyl or other ethylenically unsaturated hydrocarbon radicals only at the terminal positions and a second polydiorganosiloxane containing both terminal vinyl radicals and from 1 to 5 mole percent of vinyl radicals on non-terminal repeating units. Jensen teaches the composition can contain 10 to 60 weight percent, based on the weight of the composition, of a reinforcing silica filler and that the filler can be treated with a treating agent such as a hexaorganodisilazane. Jensen also teaches the use of a dimethylsiloxane/methylhydrogensiloxane copolymer as a crosslinker, where the copolymer comprises from 10 to about 50 repeating units per molecule and from 3 to 5 of the repeating units are methylhydrogensiloxane.

SUMMARY OF INVENTION

The present invention is a platinum curing organosiloxane composition having improved hysteresis characteristics when cured. The composition requires the presence of a diorganovinylsiloxy terminated polydiorganosiloxane having a viscosity within a range of about 20 Pa·s to 200 Pa·s at 25° C. and containing essentially no ethylenically unsaturated hydrocarbon radicals bonded to non-terminal silicon atoms and a diorganovinylsiloxy terminated polydiorganosiloxane having a viscosity within a range of about 0.1 Pa·s to 200 Pa·s at 25° C., where from 1 to 5 percent of the non-terminal repeating units of the siloxane comprise a vinyl radical. In addition, the present composition comprises 10 to 30 weight percent of a reinforcing silica filler that has been treated with hexamethyldisilazane and 1,1,3,3-tetramethyl-1,3-divinyldisilazane, and an organohydrogen siloxane resin crosslinker comprising greater than five silicon-bonded hydrogen atoms per molecule.

DESCRIPTION OF INVENTION

The present invention is a curable organosiloxane composition having improved hysteresis characteristics when cured. The curable composition is that obtained by mixing components comprising:

(A) 35 to 75 weight percent, based on the weight of the composition, of a diorganovinylsiloxy terminated polydiorganosiloxane having a viscosity within a range of about 20 Pa·s to 200 Pa·s at 25° C. and containing essentially no ethylenically unsaturated hydrocarbon radicals bonded to non-terminal silicon atoms, (B) 0 to 30 weight percent, based on the weight of the composition, of a diorganovinylsiloxy terminated polydiorganosiloxane having a viscosity less than about 20 Pa·s at 25° C. and containing essentially no ethylenically unsaturated hydrocarbon radicals bonded to non-terminal silicon atoms, (C) about 5 to 30 weight percent, based on the weight of the composition, of a diorganovinylsiloxy terminated polydiorganosiloxane having a viscosity within a range of about 0.1 Pa·s to 200 Pa·s at 25° C., where from 1 to about 5 percent of the non-terminal repeating units of the diorganovinylsiloxy terminated polydiorganosiloxane comprise a vinyl radical, (D) 10 to 30 weight percent, based on the weight of the composition, of a reinforcing silica filler, (E) 0.5 to 10 weight percent, based on the weight of the reinforcing silica filler, of 1,1,3,3-tetramethyl-1,3-divinyldisilazane, (F) 10 to 35 weight percent, based on the weight of the reinforcing silica filler, of hexamethyldisilazane, (G) 0.1 to 10 weight percent water, based on the weight of the composition, (H) an amount sufficient to cure the composition of an organohydrogensiloxane resin crosslinker comprising units selected from a group consisting of siloxy units described by formulas $R^1R^2SiO_{2/2}$ and $R^1{}_2R^2SiO_{1/2}$ and at least 1 mole percent of units selected from a group consisting of siloxy units described by formulas $R^2SiO_{3/2}$ and $SiO_{4/2}$ and comprising greater than 5 silicon-bonded hydrogen atoms per molecule, where each $R^1$ is independently selected from a group consisting of saturated monovalent hydrocarbon radicals comprising one to about 10 carbon atoms and aromatic hydrocarbon radicals, and $R^2$ is selected from a group consisting of hydrogen atoms and $R^1$, and (I) a platinum hydrosilation catalyst in an amount sufficient to effect curing of the composition.

Component (A) comprises 35 to 75 weight percent, based on the weight of the composition of a diorganovinylsiloxy terminated polydiorganosiloxane described by formula

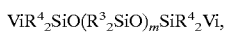

where Vi represents a vinyl radical, $R^3$ and $R^4$ are independently selected saturated monovalent hydrocarbon radicals comprising about one to 20 carbons atoms, and m represents a degree of polymerization equivalent to a viscosity of about 20 Pa·s to 200 Pa·s at 25° C. Preferred is when m represents a degree of polymerization equivalent to a viscosity of about 40 Pa·s to 70 Pa·s at 25° C. Component (A) contains essentially no ethylenically unsaturated hydrocarbon radicals bonded to non-terminal silicon atoms. By the term "essentially no ethylenically unsaturated hydrocarbon radicals bonded to non-terminal silicon atoms," it is meant that the only ethylenically unsaturated hydrocarbon radicals present on the non-terminal silicon atoms of component (A) results from impurities present in the reactants used to prepare component (A) or from undesired rearrangements occurring during the preparation of component (A).

In component (A) it is preferred that $R^4$ be an alkyl comprising about one to four carbon atoms. Most preferred is when all of the $R^4$ substituents of component (A) are methyl.

In component (A) it is desirable that at least one of the $R^3$ radicals substituted on the non-terminal silicon atoms be an alkyl comprising about 1 to 4 carbon atoms, preferably methyl. The other $R^3$ radicals substituted on the non-terminal silicon atoms can be alkyls such as methyl or ethyl, substituted alkyls such as chloromethyl, 3-chloropropyl, or 3,3,3-trifluoropropyl; cycloalkyls such as cyclopentyl or cyclohexyl; or aryls such as phenyl, xylyl, tolyl, and naphthyl. In component (A) it is preferred that any $R^3$ radical other than methyl be selected from a group consisting of phenyl and 3,3,3-trifluoropropyl. The preferred component (A) is a dimethylvinylsiloxy endblocked polydimethylsiloxane having a viscosity of about 40 Pa·s to 70 Pa·s at 25° C. Preferred is when component (A) comprises about 50 to 60 weight percent of the composition.

Component (B) of the present composition is described by the same formula describing component (A), with the exception that the value of m is such that the viscosity of component (B) is less than about 20 Pa·s at 25° C. Preferred is when component (B) is a dimethylvinylsiloxy terminated polydimethylsiloxane having a viscosity within a range of about 0.1 Pa·s to 1 Pa·s at 25° C. Preferred is when component (B) comprises about 1 to 5 weight percent of the composition.

Component (C) of the present composition is described by formula

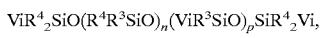

$$ViR^4{}_2SiO(R^4R^3SiO)_n(ViR^3SiO)_pSiR^4{}_2Vi,$$

where Vi is vinyl, $R^3$ and $R^4$ are as previously described, the degree of polymerization represented by the sum of n and p is equivalent to a viscosity of about 0.1 Pa·s to 200 Pa·s at 25° C. and the ratio of p/(n+p) is within a range of about 0.01 to 0.05. It is preferred that the degree of polymerization of component (C) be less than that of component (A) and that the viscosity be about 0.1 Pa·s to 20 Pa·s at 25° C.

To achieve high tear strength without adversely affecting other physical properties of the cured elastomer prepared from the present invention, component (C) must comprise about 5 to 30 weight percent of the weight of the composition. Preferred is when component (C) comprises about 5 to 15 weight percent of the weight of the composition.

To insure that component (A), component (B), and component (C) are miscible it is preferred that the $R^3$ and $R^4$ substituents of each component be the same. A preferred composition is where all $R^3$ substituents and all $R^4$ substituents are methyl.

Methods of preparing component (A), component (B), and component (C) of the present composition by hydrolysis and condensation of the corresponding halosilanes or cyclic polydiorganosiloxanes are well known in the art and are not described herein.

Component (D) of the present composition is a reinforcing silica filler. Any finely divided form of silica can be used as the reinforcing filler. Preferred is when the reinforcing silica filler is a colloidal silica prepared by a precipitation or fume process. Colloidal silicas are preferred because of their relatively high surface area, which is typically at least 50 square meters per gram (m²/g). It is preferred that the reinforcing silica filler have a surface area of at least 300 m²/g. Most preferred is when the reinforcing silica filler is a fume silica having a surface area within a range of about 300 m²/g to 500 m²/g.

The present composition can contain 10 to 30 weight percent of the reinforcing silica filler, based on the total weight of the composition. The present inventors have unexpectedly discovered that a filler amount within the described range is critical to the realization of the excellent hysteresis properties of the present composition when cured. Preferred is when the present composition comprises about 20 to 25 weight percent of the reinforcing silica filler, based on the total weight of the composition.

The reinforcing silica filler of the present composition must be treated with 0.5 to 10 weight percent of 1,1,3,3-tetramethyl-1,3-divinyldisilazane (component (E)), based on the weight of the reinforcing silica filler. The use of component (E) is also critical to the realization of the excellent hysteresis properties of the present composition when cured. Preferred is when component (E) comprises about 1 to 5 weight percent of the weight of the reinforcing silica filler.

The reinforcing silica filler of the present composition must be treated with 10 to 35 weight percent of hexamethyldisilazane (component (F)), based on the weight of the reinforcing silica filler. The use of component (F) is also critical to the realization of the excellent hysteresis properties of the present composition when cured. Preferred is when component (F) comprises about 15 to 25 weight percent of the reinforcing silica filler.

The present compositions comprises 0.1 to 10 weight percent water (component (G)), based on the weight of the composition. Preferred is when the present composition comprises about 0.5 to 1 weight percent water, based on the weight of the composition. The water may be added to the composition separately or in combination with other components of the composition such as the silica filler. The water functions in the present composition to effect the hydrolysis of component (E) and component (F) thereby facilitating the treatment of the reinforcing silica filler.

The method of treating the reinforcing silica filler with component (E) and component (F) is not critical to the present composition and can be any of those generally known in the art. The reinforcing silica filler may be treated with component (E) and component (F) simultaneously in the presence of water. The reinforcing silica filler may be treated with either component (E) or component (F) separately, each in the presence of a portion of the water, followed by treatment with the other component. The reinforcing silica filler may be treated either in the absence or presence of components (A) through (C) of the present composition, in the presence of the water. The preferred method for treating the reinforcing silica filler is described below in the preferred process for making the present composition.

Component (H) of the present composition is an organohydrogensiloxane resin crosslinker comprising greater than 5 silicon-bonded hydrogen atoms per molecule. Component (H) can consist of units described by formulas $R^1{}_2R^2SiO_{1/2}$ and $R^2SiO_{3/2}$ and must contain at least 1 mole percent of units selected from the group consisting of $R^2SiO_{3/2}$ and $SiO_{4/2}$; where each $R^1$ is independently selected from a group consisting of saturated monovalent hydrocarbon radicals comprising about one to ten carbon atoms and aromatic hydrocarbon radicals and $R^2$ is selected from a group consisting of hydrogen atoms and $R^1$. $R^1$ can be, for example, a lower alkyl such as methyl or ethyl; a substituted alkyl such as chloromethyl and 3,3,3-trifluoropropyl; and an aryl such as phenyl. Preferred is when $R^1$ is methyl. It is preferred that component (H) comprise at least 10 silicon-bonded hydrogen atoms per molecule. More preferred is when component (H) comprises about 40 to 70 silicon bonded hydrogen atoms per molecule. Component (H) is an organohydrogensiloxane resin. By "resin" it is meant that the organohydrogensiloxane comprises at least 1 mole percent of units selected from the group consisting of $R^2SiO_{3/2}$ and $SiO_{4/2}$.

A preferred component (H) for use in the present process is described by formula $(Me_3SiO_{1/2})_a(Me_2SiO)_b(MeHSiO)_c(MeSiO_{3/2})_d$, where Me represents methyl, a=5 to 20, b=20 to 40, c=50 to 60, and d=3 to 5. The viscosity of component (H) is not critical to the present invention, however it is preferred that component (H) have the viscosity of a pourable liquid at room temperature. If required, component (H) can be dissolved in a suitable solvent to facilitate mixing into the present composition.

Component (H) is added to the present composition at a concentration sufficient to cure the composition. In a preferred composition, component (H) is added at a concentration sufficient to provide about 1 to 5 silicon-bonded hydrogen atoms per silicon-bonded vinyl radical provided to the composition by components (A), (B), and (C). Most preferred is when component (H) provides about 1.5 to 2.2 silicon-bonded hydrogen atoms per silicon-bonded vinyl radical provided to the composition by components (A), (B), and (C).

The organohydrogensiloxane resin crosslinker comprising component (H) is another component of the present composition that is important to the realization of the improved hysteresis characteristic of the composition when cured.

Component (I) of the present composition is a platinum hydrosilation catalyst present in an amount sufficient to effect curing of the composition. The platinum hydrosilation catalyst can be platinum metal or a compound of platinum. The platinum compound can be, for example, hexachloroplatinic acid or platinum dichloride. Complexes of such platinum compounds with low-molecular weight vinyl-containing organosiloxane compounds are preferred because of their high activity and compatibility with the organosiloxane compositions. Such complexes are described, for example, in Willing, U.S. Pat. No. 3,419,593, which is incorporated herein by reference for its teaching of platinum hydrosilation catalysts useful in the present compositions.

The platinum hydrosilation catalyst comprising component (I) can be present in an amount equivalent to as little as one part by weight elemental platinum per one million parts of the curable composition. Catalyst concentrations equivalent to 5 to 50 parts by weight of elemental platinum per one million parts of the curable composition are preferred to achieve a practical curing rate.

The present curable composition may begin to cure at ambient temperature. To obtain a longer working time or "pot life", the activity of the catalyst can be retarded or suppressed by addition of a suitable platinum hydrosilation catalyst inhibitor. The inhibitor can be any of those known to inhibit platinum catalyzed hydrosilation reactions. Known platinum catalyst inhibitors include the acetylenic compounds disclosed in Kookootsedes et al., U.S. Pat. No. 3,445,420. A preferred class of inhibitors as described by Kookootsedes et al. for use in the present curable compositions are acetylenic alcohols as exemplified by 2-methyl-3-butyn-2-ol and 1-ethynyl-1-cyclohexanol. Another class of platinum hydrosilation catalyst inhibitors suitable for use in the present curable compositions are olefinically substituted siloxanes as described by Lee et al., U.S. Pat. No. 3,989,667. of those inhibitors described by Lee et al. cyclic methylvinylsiloxanes are preferred.

Inhibitor concentrations as low as one mole of inhibitor per mole of platinum may in some instances impart satisfactory storage stability and cure rate. In other instances inhibitor concentrations up to 500 or more moles of inhibitor per mole of platinum may be required. The optimum concentration for a given inhibitor in a composition can readily be determined by routine experimentation.

In addition to the components (A) through (I) and optionally a platinum hydrosilation catalyst inhibitor, the present composition may contain one or more additives that are conventionally present in curable compositions of this type. Typical additives include but are not limited to, mold release agents, pigments, dyes, adhesion promoters, flame retardants, heat stabilizers, and ultraviolet light stabilizers.

In a preferred embodiment of the present composition, an optional mold release agent is added to the composition. A preferred mold release agent comprises a low molecular weight dimethylhydroxy terminated polydimethylsiloxane. Preferred is when the low molecular weight dimethylhydroxy terminated polydimethylsiloxane has a viscosity of about 0.04 Pa·s at 25° C.

The present composition may be packaged as a two-part composition with each part consisting of a portion of a mixture comprising components (A) through (G) and the organohydrogensiloxane resin crosslinker and optionally an inhibitor being added to one part and the platinum hydrosilation catalyst being added to the other part. The two parts can then be mixed prior to use.

In a preferred method for making the present curable composition, component (A) and the water (component (G)) are added to a standard mixer, such as a Baker Perkins type mixer. These two components are mixed for about one minute then component (E), the 1,1,3,3-tetramethyl-1,3-divinyldisilazane, is added to the mixture and mixing continued for an additional one minute. About one-half of component (F), the hexamethyldisilazane is added to the mixture and mixing continued for an another three minutes. About one-half of component (D), the reinforcing silica filler, is added to the mixture and mixing continued for an additional five minutes. One-third of component (F), the hexamethyldisilazane, is added to the mixture and mixing continued for another three minutes. One-third of component (D), the silica reinforcing filler, is added to the mixture and mixing continued for another five minutes. The remainder of component (D), the reinforcing silica filler, is then added to the mixture and mixing continued for five minutes. The remainder of component (F), the hexamethyldisilazane, is added to the mixture and mixing continued for an additional 15 minutes. This mixture is then heated at above 160° C. for 90 minutes under vacuum to remove volatiles. The mixture is cooled and cutback by adding component (B) and component (C) with sufficient mixing to form a homogeneous mixture referred to herein as the "base". In some instances it may be desirable to initially add only a portion of component (A) to the mixer and to use the remaining portion as part of the cutback materials.

The cure components of the composition comprising component (H) and component (I) along with any optional components can then be added to the base by standard methods.

The following examples are provided to illustrate the present invention. These examples are not intended to limit the scope of the claims herein. Compositions containing the components as described in Table 1 were prepared by the preferred method described above. The weight percent of each component in the composition, as a percent of the total composition weight, is described in Table 2. In the tables the heading "Comp.", identifies the column containing the designator for each of the components of the present composition.

TABLE 1

Component Description

| Comp. | Description |
|---|---|
| A | Dimethylvinylsiloxy terminated polydimethylsiloxane having a viscosity of about 55 Pa·s at 25° C. |
| B | Dimethylvinylsiloxy terminated polydimethylsiloxane having a viscosity of 0.3 to 0.5 Pa·s at 25° C. |
| C | Dimethylvinylsiloxy terminated polydimethyl (methylvinyl) siloxane having a viscosity of 0.3 to 0.4 Pa·s at 25° C, where 2 mole percent of the non-terminal substituents on silicon are vinyl. |
| D | Reinforcing silica filler, fumed, with a BET surface area of 400 m$^2$/g. |
| E | 1,1,3,3-Tetramethyl-1,3-divinyldisilazane |
| F | Hexamethyldisilazane |
| G | Water |
| H | Organohydrogensiloxane resin described by formula $(Me_3SiO_{1/2})_{12.7}(Me_2SiO)_{29.1}(MeHSiO)_{54.6}(MeSiO_{3/2})_{3.6}$ |
| I | Neutralized reaction product of chloroplantinic acid and sym-divinyltetramethyldisiloxane (0.53 weight percent platinum). |
| J | Dimethylhydroxy terminated polydimethylsiloxane having a viscosity of about 0.04 Pa·s at 25° C. |
| K | 1-Ethynyl-1-cyclohexanol |

TABLE 2

Compositions (Weight Percent of Composition)

| Comp. | Composition Number 11-2 | Composition Number 13-2 |
|---|---|---|
| A | 53.6 | 67.4 |
| B | 15.2 | 0.00 |
| C | 7.0 | 10.6 |
| D | 16.9 | 15.1 |
| E | 0.26 | 0.27 |
| F | 3.4 | 3.0 |
| G | 0.70 | 0.62 |
| H | 1.7 | 1.6 |
| I | 0.11 | 0.12 |
| J | 1.1 | 1.2 |
| K | 0.03 | 0.03 |

Physical properties of the compositions, as described in Table 2, were evaluated by the following methods and the results are described in Table 3. The percent hysteresis was determined on test domes molded from the compositions and cured at 360° C. to 380° C. for 10 to 15 seconds. Percent hysteresis is expressed as the diminishing of height of the test dome immediately after being depressed and allowed to rebound. Depression force is the grams of force necessary to cause an essentially full depression of the test dome. The average extrusion rate is the weight in grams per minute of the test composition extruded at a pressure of 0.62 MPa through a die having an oval 3.18 mm orfice.

Cured test samples of each composition were also prepared 30 for testing by standard ASTM test methods. The samples were cured at 150° C. for 5 minutes. The physical properties tested and the test methods are: durometer (shore A), ASTM D2240; Tear (Die B), ASTM 625; and Tensile, Elongation, and Modulus (100%), ASTM 412.

TABLE 3

Physical Properties

| Test Method | Composition Number 11-2 | Composition Number 13-2 |
|---|---|---|
| Depression (gm) | 54.7 | 52.2 |
| Hysteresis (%) | 8.1 | 7.0 |
| Ext. Rate (g/min) | 201 | 199 |
| Durometer | 44 | 44 |
| Tear (Die B) kN/m | 22.2 | 21.7 |
| Tensile (MPa) | 6.0 | 6.8 |
| Elongation, % | 247 | 312 |
| Modulus (100%), MPa | 1.8 | 1.8 |

We claim:

1. A curable organosiloxane composition obtained by mixing components comprising:
    (A) 35 to 75 weight percent, based on the weight of the composition, of a diorganovinylsiloxy terminated polydiorganosiloxane having a viscosity within a range of about 20 Pa·s to 200 Pa·s at 25° C. and containing essentially no ethylenically unsaturated hydrocarbon radicals bonded to non-terminal silicon atoms,
    (B) 0 to 30 weight percent, based on the weight of the composition, of a diorganovinylsiloxy terminated polydiorganosiloxane having a viscosity less than about 20 Pa·s at 25° C. and containing essentially no ethylenically unsaturated hydrocarbon radicals bonded to non-terminal silicon atoms,
    (C) about 5 to 30 weight percent, based on the weight of the composition, of a diorganovinylsiloxy terminated polydiorganosiloxane having a viscosity within a range of about 0.1 Pa·s to 200 Pa·s at 25° C., where from 1 to about 5 percent of the non-terminal repeating units of the diorganovinylsiloxy terminated polydiorganosiloxane comprise a vinyl radical,
    (D) 10 to 30 weight percent, based on the weight of the composition, of a reinforcing silica filler,
    (E) 0.5 to 10 weight percent, based on the weight of the reinforcing silica filler, of 1,1,3,3-tetramethyl-1,3-divinyldisilazane,
    (F) 10 to 35 weight percent, based on the weight of the reinforcing silica filler, of hexamethyldisilazane,
    (G) 0.1 to 10 weight percent water, based on the weight of the composition,
    (H) an amount sufficient to cure the composition of an organohydrogensiloxane crosslinker comprising units selected from the group consisting of siloxy units described by formulas $R^1R^2SiO_{2/2}$ and $R^1{}_2R^2SiO_{1/2}$ and at least 1 mole percent of units selected from the group of siloxy units described by formulas $R^2SiO_{1/2}$ and $SiO_{4/2}$ and comprising greater than 5 silicon-bonded hydrogen atoms per molecule, where each $R^1$ is independently selected from a group consisting of saturated monovalent hydrocarbon radicals comprising about one to ten carbon atoms and aromatic hydrocarbon radicals, and $R^2$ is selected from a group consisting of hydrogen atoms and $R^1$, and
    (I) a platinum hydrosilation catalyst in an amount sufficient to effect curing of the composition.

2. A composition according to claim 1, further comprising a platinum hydrosilation catalyst inhibitor in an amount sufficient to inhibit curing of the composition.

3. A composition according to claim 1 further comprising a mold release agent comprising a low molecular weight dimethylhydroxy terminated polydimethylsiloxane.

4. A composition according to claim 2, further comprising a mold release agent comprising a low molecular weight dimethylhydroxy terminated polydimethylsiloxane.

5. A composition according to claim 1, where component (A) is a dimethylvinylsiloxy terminated polydimethylsiloxane having a viscosity of about 40 Pa·s to 70 Pa·s at 25° C.

6. A composition according to claim 1, where component (A) comprises about 50 to 60 weight percent of the composition.

7. A composition according to claim 1, where component (B) is a dimethylvinylsiloxy terminated polydimethylsiloxane having a viscosity within a range of about 0.1 Pa·s to 1 Pa·s at 25° C.

8. A composition according to claim 1, where component (B) comprises about 1 to 5 weight percent of the composition.

9. A composition according to claim 1, where component (C) is a dimethylvinylsiloxy terminated polydiorganosiloxane, 1 to about 5 percent of the non-terminal repeating units are methylvinylsiloxy units, the remainder of the non-terminal repeating units are dimethylsiloxy units, and the viscosity is about 0.1 Pa·s to 20 Pa·s at 25° C.

10. A composition according to claim 1, where component (C) comprises about 5 to 15 weight percent of the weight of the composition.

11. A composition according to claim 1, where the reinforcing silica filler is a colloidal silica having a surface area of at least 50 m$^2$/g.

12. A composition according to claim 1, where the reinforcing silica filler is a fumed silica having a surface area within a range of about 300 m$^2$/g to 500 m$^2$/g.

13. A composition according to claim 12, where the reinforcing silica filler comprises about 20 to 25 weight percent of the composition.

14. A composition according to claim 1, where component (E) comprises about 1 to 5 weight percent of the weight of the reinforcing silica filler.

15. A composition according to claim 1, where component (F) comprises about 15 to 25 weight percent of the reinforcing silica filler.

16. A composition according to claim 1, where component (H) comprises at least 10 silicon-bonded hydrogen atoms per molecule.

17. A composition according to claim 1, where component (H) comprises about 40 to 70 silicon-bonded hydrogen atoms per molecule.

18. A composition according to claim 1, where component (H) is described by formula $(Me_3SiO_{1/2})_a(Me_2SiO)_b(MeHSiO)_c(MeSiO_{3/2})_d$ and Me represents methyl, a=5 to 20, b=20 to 40, c=50 to 60, and d=3 to 5.

19. A composition according to claim 1, where component (H) is present at a concentration sufficient to provide about 1 to 5 silicon-bonded hydrogen atoms per silicon-bonded vinyl radical provided to the composition by components (A), (B), and (C).

20. A composition according to claim 1, where component (H) is present at a concentration sufficient to provide about 1.5 to 2.2 silicon-bonded hydrogen atoms per silicon-bonded vinyl radical provided to the composition by components (A), (B), and (C).

21. A composition according to claim 1, where the platinum hydrosilation catalyst is a neutralized reaction product of chloroplatinic acid and sym-divinyltetramethyldisiloxane.

22. A composition according to claim 1, where the platinum hydrosilation catalyst is present in an amount providing 5 to 50 parts by weight of elemental platinum per one million parts of the composition.

23. A composition according to claim 1, where the composition is packaged as a two-part composition with each part consisting of a portion of a mixture comprising components (A) through (G) and component (H) being added to one part and component (I) being added to the other part.

24. A curable organosiloxane composition obtained by mixing components comprising:

(A) 50 to 60 weight percent, based on the weight of the composition, of a dimethylvinylsiloxy terminated polydimethylsiloxane having a viscosity within a range of about 40 Pa·s to 70 Pa·s at 25° C. and containing essentially no ethylenically unsaturated hydrocarbon radicals bonded to non-terminal silicon atoms, (B) 1 to 5 weight percent, based on the weight of the composition, of a methylvinylsiloxy terminated polydimethylsiloxane having a viscosity within a range of about 0.1 Pa·s to 1 Pa·s at 25° C. and containing essentially no ethylenically unsaturated hydrocarbon radicals bonded to non-terminal silicon atoms, (C) about 5 to 15 weight percent, based on the weight of the composition, of a dimethylvinylsiloxy terminated polydiorganosiloxane having a viscosity within a range of about 0.1 Pa·s to 20 Pa·s at 25° C., where from 1 to about 5 percent of the non-terminal repeating units of the dimethylvinylsiloxy terminated polydiorganosiloxane are methylvinylsiloxy units and the remainder of the non-terminal repeating units are dimethylsiloxy units, (D) 20 to 25 weight percent, based on the weight of the composition, of a fumed silica having a surface area within a range of about 300 m$^2$/g to 500 m$^2$/g, (E) 1 to 5 weight percent, based on the weight of the reinforcing silica filler, of 1,1,3,3-tetramethyl-1,3-divinyldisilazane, (F) 15 to 25 weight percent, based on the weight of the reinforcing silica filler, of hexamethyldisilazane, (G) 0.5 to 1 weight percent water, based on the weight of the composition, (H) an amount sufficient to cure the composition of an organohydrogensiloxane resin crosslinker described by formula $(Me_3SiO_{1/2})_a(Me_2SiO)_b(MeHSiO)_c(MeSiO_{3/2})_d$, where Me represents methyl, a=5 to 20, b=20 to 40, c=50 to 60, and d=3 to 5, (I) a platinum hydrosilation catalyst in an amount sufficient to effect curing of the composition, and (J) a mold release agent comprising a low molecular weight dimethylhydroxy terminated polydimethylsiloxane in an amount sufficient to facilitate release of the composition from a mold when the composition is cured.

* * * * *